(No Model.)

E. A. SPERRY.
ELECTRIC BRAKE.

No. 534,974. Patented Feb. 26, 1895.

Witnesses:
J. B. McGinn
Wm. McCarthy

Inventor:
Elmer A. Sperry

UNITED STATES PATENT OFFICE.

ELMER A. SPERRY, OF CLEVELAND, OHIO, ASSIGNOR TO THE SPERRY ELECTRIC RAILWAY COMPANY, OF OHIO.

ELECTRIC BRAKE.

SPECIFICATION forming part of Letters Patent No. 534,974, dated February 26, 1895.

Application filed January 30, 1894. Serial No. 498,511. (No model.)

*To all whom it may concern:*

Be it known that I, ELMER A. SPERRY, a citizen of the United States, residing at Cleveland, in the county of Cuyahoga and State of Ohio, have invented new and useful Improvements in Electric Brakes, of which the following is a specification.

My invention relates to electric brakes for vehicles, and consists in the novel arrangement of parts whereby the axle is arrested in its motion by the direct action of magnetism or electric action produced by electric currents, all constructed and applied in the manner hereinafter specified and claimed, and illustrated in the accompanying drawings, in which—

Figure 1:
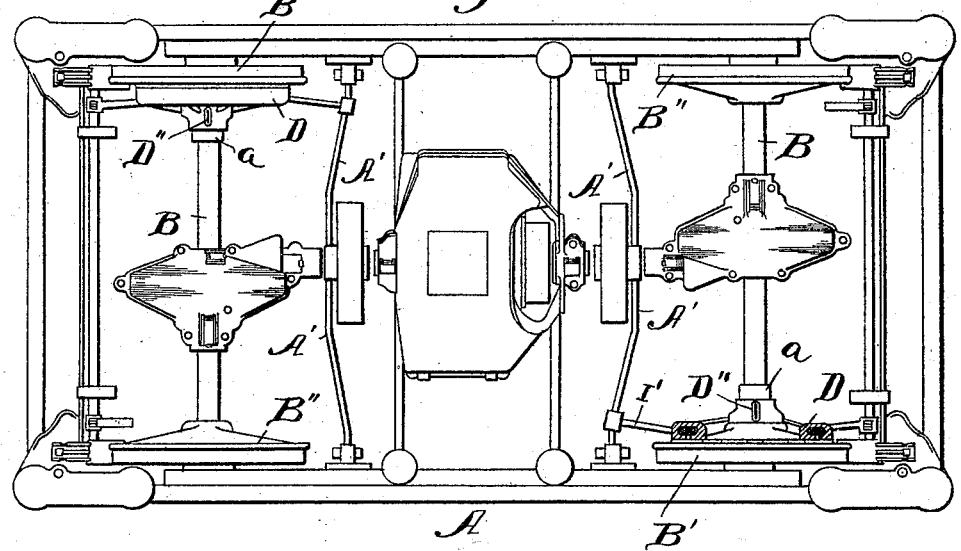
Figure 2:
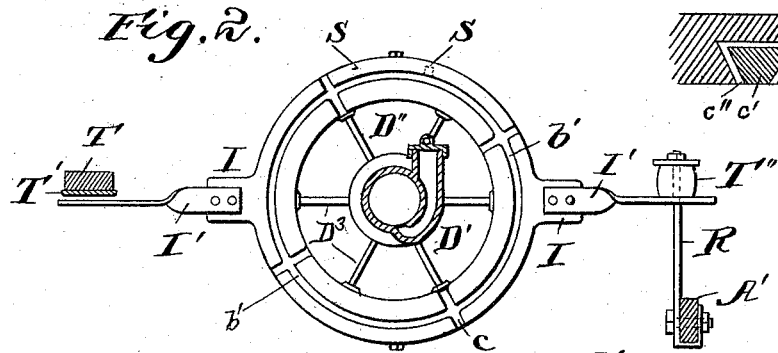
Figure 4:
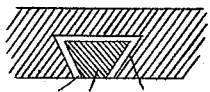
Figure 3:
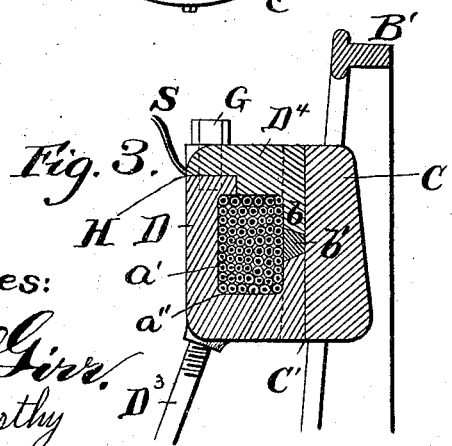

Figure 1 shows a plan view of an electric street car truck with brake shown in position. Fig. 2 is a face view of the brake magnet; Fig. 3, a section of same, together with a section of the portion secured to the axle of the car. Fig. 4 is a detail.

Like letters of reference indicate similar parts throughout the figures.

The truck frame A is supported by axles B B mounted on wheels B' B' and B'' B'', the former being special and provided with a filling between the spokes indicated at C, Fig. 3, which is faced at C' and co-operates with the brake magnet D mounted upon the axle B by journal D' provided with an oiler D'', the hub being constructed to abut against the collar $a$. The arms $D^3$ connect the brake magnet proper with the hub. A portion $D^4$ of the magnet may be separable for the purpose of ease in winding the coil $a'$ which is suitably insulated as indicated at $a''$. A lip $b\ b$ partially overlaps the annular groove occupied by the coil $a'$, leaving a dove-tailed annular slot indicated at $b'$ between them. The two portions of the magnet are secured by bolts G G, the joint being indicated at H. The slot $b'$ intercepts radial dove-tailed slots $c\ c\ c\ c$, see Figs. 2 and 4, in each of which is placed a solid lubricant $c'$, being held in position by a suitable composition, cement or metal filling $c''$, the latter being preferred.

I have found that by using certain compositions and metals as filling at point $c''$, that they themselves may be employed either alone or co-operating with the lubricant $c'$, or simply supplemental to the same, as a lubricating substance. The filling, such for instance as lead or Babbitt, indicated at $c''$, is made also to fill the annular recess $b'$ from the insulation upon the magnet coil up flush with the surface. Suitably secured to the magnet are projections I I into which are secured pieces, preferably of wrought iron, I' I', for preventing the rotation of the magnet.

A peculiarity in arresting the rotary motion consists in the fact that the projections I' I' are brought so in each case that they shall be under their respective abutments, being, in the case illustrated to the left, a portion of the truck T and anti-rattling cushion of leather or the like indicated at T', and being, on the other side, a rod R and rubber cushion T'' secured to the cross-bar A' of the truck. The advantage of this arrangement consists in the fact that upon each application of the brake, no matter in which direction the car is moving, the abutting pressure is upward, and, lifting, tends to relieve the journal bearing of the axle of its friction due to the weight of the supported mass, some of the weight in this event being carried by the tendency of the brake to rotate. The advantage of this arrangement over the old form of applying a brake-shoe, which increases the pressure on the journal, will readily be understood.

Any means can be provided for preventing rotation of the magnet, as will readily be understood. The electrical terminals of the magnet are indicated at S and S' being brought through suitable apertures. No contact device is required, as the magnet is stationary. The oiling device is located to one side of the journal, and feeds the lubricant, preferably grease, at the bottom of the axle so as not to rob the journal of bearing and working surface above, where most needed, and which point is required to sustain all the weight of the magnet.

The use and operation of the device may be described as follows: The enlarged faces produced by the lips $b\ b$ greatly reduce the magnetic reluctance of the air gap which constitutes a portion of the magnetic circuit. The joint at H is also greater than the section of the metal at this point, which is found further to reduce the reluctance of the circuit. The action in retarding is a peculiar and novel one, and consists in the generating of currents in the masses constituting the axle projection C. The metal filling $b''$ is also found to be of great service in aiding in the retarding by offering a ready conductor for the currents generated the most intensely at or just under the faces, the reason for this being that the metal filling at this point being an electrical conductor lends itself to circulation of the eddy currents and in fact where none would circulate in the old form of magnet owing to an air gap or wood-filling occupying this space. The lubricator $c'$ should be of a graphitic, carbon or other conducting substance which is found still further to greatly enhance the retarding effect of the brake as a whole.

The principal advantage in using graphite as a lubricant is, while it affords lubrication for the faces with a dry and non-adhesive substance, non dust collecting, &c., it at the same time affords a filling between the surfaces which is an excellent conductor of the eddy currents set up in the masses of both the magnet and the moving part and which tend to flow from surface to surface, the presence of the conducting substance affording much freer and fuller circulation, and these eddy currents thus consume an extra amount of mechanical energy in their production.

The magnetic "adherence" due to a given magnetic density is known. The coefficient of friction between the surfaces so adhering is also readily determinable. The retarding influence however, is found to vary directly with the velocity, and at a velocity, say, of sixty-five revolutions a minute, to be far in excess of an amount of retardation that would be due to the friction caused by the pressures of adherence. This action is due to the Foucault or eddy currents produced in the moving masses from a cutting of the lines of force circulating through the stationary magnet. Under conditions of velocity investigated, to this production of current can be traced much more retardation than to the simple friction. It will thus be seen that the production of these eddy currents is the principal factor in the retarding action of the brake; and the friction due to the magnetic adherence is really the secondary factor. Any feature aiding the free circulation of these eddy currents is found to greatly facilitate the action of the device. These have been named above, and are primarily the perfect contact between the stationary and moving element; secondly, a lubricant at this point which is a conductor, and, thirdly, a non-magnetic electrical conductor filling the circular gap $b'$, all of which aid the currents which are produced at the immediate surface of the rotating element to circulate freely, which circulation is found to include the conductors on both sides of the joint $C'$.

It will readily be understood that the rotating face might be of cylindrical form rather than disk-like, and might rise up from the shaft at any convenient place thereon or be separate from the wheel and fastened thereto, and the magnet might be made in various forms, for instance, of different spools of wire or of inclosed form similar to that shown in the drawings but with a number of slots and coils filling the same; or the magnet might be made to rotate, leaving the disk or co-operating mass stationary. The magnet may be in halves or divided in any number of parts, and bolted or otherwise secured together for ease of attachment to the truck.

It will readily be understood that the lubricant-receiving recesses may be provided in either the magnet or the co-operating mass; and many other changes could be made in the details of construction and application, without departing from the spirit of my invention.

Having thus fully described my invention, what I claim as new, and desire to secure by Letters Patent, is—

1. In a brake for a car, an axle, a portion upon said axle organized to be gripped, a gripping mechanism for such rotating portion mounted upon the axle, stationary portions as a truck part supported by the car axle, projections provided on the gripping mechanism for arresting its movement protruding from such mechanism at substantially opposite points and engaging with said stationary portions by upward abutment caused by the rotation of the axle.

2. In a brake for a car, a rotating axle, a portion upon such axle presenting a surface organized to be gripped, a stationary gripping mechanism for such rotating portion having a cooperating surface, a groove in one of the surfaces, and a lubricant in said groove.

3. In a brake for a car, a rotating axle, a portion upon such axle presenting a surface organized to be gripped, a stationary gripping mechanism for such rotating portion having a cooperating surface, a groove in one of the surfaces, and a solid lubricant in said groove.

4. In a brake for a car, a rotating axle, a portion upon such axle presenting a surface organized to be gripped, a stationary gripping mechanism for such rotating portion having a cooperating surface, a groove in one of the surfaces, a solid lubricant in said groove, and a metal or metal-like filling or lining between the walls of the groove and the lubricant.

5. In a brake for a car, a rotating axle, a portion upon such axle presenting a surface organized to be gripped, a stationary gripping mechanism for such rotating portion having a cooperating surface, a groove in one of the surfaces at a substantial angle to the direction of relative movement between the surfaces, and a lubricant in said groove.

6. In a brake for a car, a rotating axle, a portion upon such axle presenting a surface organized to be gripped, a stationary gripping mechanism for such rotating portion having a cooperating surface, a groove in one of the surfaces, and an electro-conducting lubricant in said groove.

7. In a brake for a car, a rotating axle, a portion upon such axle presenting a circular face organized to be gripped, a stationary gripping electro-magnet for such rotating portion having a cooperating face, a groove or depression in one of the faces extending circumferentially along such face and at one or more points also crosswise or at a substantial angle to such circumferential groove and an electro-conducting filling within such grooves.

8. In an electric retarding device, a moving mechanism, a surfaced mass of magnetic material and a circular electro-magnet having a cooperating face, the two being mounted for relative movement, a groove or depression in said magnet, a suitable electric conductor in the deeper portion of said groove or depression, a portion of the groove next the surface not occupied by said conductor, in combination with an electro-conducting filling in the said last named portion and next the surface.

9. In an electric retarding device, a moving mechanism, a surfaced mass of magnetic material and a circular electro-magnet having a cooperating face, the two being mounted for relative movement, a groove or depression in said magnet, a suitable electric conductor in the deeper portion of said groove or depression, a portion of the groove next the surface not occupied by said conductor, the walls of this portion approaching each other toward the outer surface, in combination with an electro-conducting filling in said last named portion and next the surface.

10. In an electric retarding device, a moving mechanism, a surfaced mass of magnetic material and a circular electro-magnet having a cooperating face, the two being mounted for relative movement, a groove or depression in said magnet being comparatively small at its face and recessed or widening at points deeper or farther removed from such face, presenting thereby enlarged magnetic faces or poles, a suitable electric conductor located in the deeper portion of such depression or recess, a portion of said recess next the surface not occupied by such conductor, in combination with an electro-conducting filling in the contracted portion of the groove above said conductor.

11. In a brake for an electric car, a rotating axle, a portion upon such axle organized to be gripped, a stationary gripping mechanism for such rotating portion, a portion supported from the car axles, projections provided on the gripping mechanism for arresting its movement, in combination with cooperating abutments on the stationary portion located each side of the axle above said projection.

12. In an electric brake for a car, a rotating axle, a portion upon such axle organized for the action of the brake, an electro-magnetic brake cooperating with such portion, a portion supported from the car axles, abutments provided on the magnet for arresting its movement, in combination with cooperating abutments on the stationary portion located each side of the axle above said magnet abutments.

13. In an electric retarding device, a moving mechanism, a surfaced mass of magnetic material and a circular electro-magnet having a cooperating face, the two being mounted for relative movement, a groove or depression in said magnet being comparatively small at its face and recessed or widening at points deeper or farther removed from such face, presenting thereby enlarged magnetic faces or poles, the magnet being formed of different members which are secured to each other for purposes of forming such recess and of inserting the conductor, a suitable electric conductor located in the deeper portion of such depression or recess, a portion of such recess next the surface not occupied by such conductor, in combination with an electro-conducting filling in the contracted portion of the groove above said conductor.

14. In a brake for an electric car, a rotating axle, a portion upon such axle organized to be gripped, a gripping mechanism for such rotating portion, a stationary portion supported from the car axles, a projection provided on the gripping mechanism for arresting its movement, in combination with a cushion between the projection and the stationary portion.

ELMER A. SPERRY.

Witnesses:
C. A. LONGFELLOW,
E. P. BITZU.